United States Patent
Choi (10) Patent No.: US 12,291,168 B2
(45) Date of Patent: May 6, 2025

(54) VEHICLE DIGITAL KEY SYSTEM

(71) Applicant: LG INNOTEK CO., LTD., Seoul (KR)

(72) Inventor: Jae Yeon Choi, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 96 days.

(21) Appl. No.: 18/272,480

(22) PCT Filed: Feb. 9, 2022

(86) PCT No.: PCT/KR2022/001956
§ 371 (c)(1),
(2) Date: Jul. 14, 2023

(87) PCT Pub. No.: WO2022/173209
PCT Pub. Date: Aug. 18, 2022

(65) Prior Publication Data
US 2024/0075903 A1 Mar. 7, 2024

(30) Foreign Application Priority Data
Feb. 9, 2021 (KR) .................. 10-2021-0018259

(51) Int. Cl.
*B60R 25/24* (2013.01)
*B60R 25/34* (2013.01)

(52) U.S. Cl.
CPC ............ *B60R 25/245* (2013.01); *B60R 25/34* (2013.01)

(58) Field of Classification Search
CPC .............................. B60R 25/245; B60R 25/34
See application file for complete search history.

(56) References Cited

U.S. PATENT DOCUMENTS 7,388,466 B2 * 6/2008 Ghabra .............. G07C 9/00309
340/5.72
8,571,725 B2 * 10/2013 Juzswik ................ B60R 25/245
701/2

(Continued)

FOREIGN PATENT DOCUMENTS

JP 2020-190469 11/2020
KR 10-2020-0005973 1/2020

(Continued)

OTHER PUBLICATIONS

International Search Report dated May 16, 2022 issued in Application No. PCT/KR2022/001956.

*Primary Examiner* — Thomas D Alunkal
(74) *Attorney, Agent, or Firm* — KED & ASSOCIATES (57) ABSTRACT

A vehicle digital key system according to an embodiment of the present invention comprises: a first communication module for broadcasting a first signal at a predetermined time interval, calculating, when a second signal corresponding to the first signal is received from a key fob, a distance to the key fob on the basis of the second signal, and switching, when the calculated distance is within a preconfigured first threshold, a second communication module from a sleep mode to a wakeup mode; a second communication module for switching a plurality of third communication modules from a sleep mode to a wakeup mode, and calculating a position of the key fob by using at least three third communication modules among the plurality of third communication modules; and a control unit for unlocking the door lock of a vehicle on the basis of the position of the key fob.

20 Claims, 7 Drawing Sheets

(56) References Cited

U.S. PATENT DOCUMENTS

| | | | | |
|---|---|---|---|---|
| 8,638,202 B2* | 1/2014 | Oesterling | ......... | G07C 9/00309 |
| | | | | 340/426.36 |
| 9,379,567 B2* | 6/2016 | Kracker | ................. | H02J 7/342 |
| 9,538,473 B2* | 1/2017 | Nam | ................. | H04W 52/0238 |
| 10,235,823 B1* | 3/2019 | Saleh | ..................... | H04B 17/27 |
| 10,328,900 B1* | 6/2019 | Yakovenko | ............. | B60R 25/24 |
| 2016/0325710 A1* | 11/2016 | Honkanen | ............. | B60R 25/245 |

FOREIGN PATENT DOCUMENTS

| | | |
|---|---|---|
| KR | 10-2020-0052699 | 5/2020 |
| KR | 10-2021-0008635 | 1/2021 |

\* cited by examiner

VEHICLE DIGITAL KEY SYSTEM

CROSS-REFERENCE TO RELATED PATENT APPLICATIONS

This application is a U.S. National Stage Application under 35 U.S.C. § 371 of PCT Application No. PCT/KR2022/001956, filed Feb. 9, 2022, which claims priority to Korean Patent Application No. 10-2021-0018259, filed Feb. 9, 2021, whose entire disclosures are hereby incorporated by reference.

TECHNICAL FIELD

Embodiments relate to a vehicle digital key system.

BACKGROUND ART

With the development of wireless communication technology, various devices capable of unlocking a vehicle from a long distance even without a user directly inserting a key into the vehicle have appeared. The devices, called digital keys or smart keys, allow a user at a certain distance from a vehicle to remotely unlock the vehicle or put the vehicle into a locked state.

Such a digital key should be operated only when the user is at a certain distance because vehicle theft prevention (security) and user convenience need to be simultaneously considered. To this end, a plurality of communication modules and sensors are attached to the vehicle and the digital key, thereby allowing a digital key system to determine a distance between the vehicle and the digital key in real time.

However, in order to drive the plurality of communication modules or sensors in real time, a large amount of power consumption is required, which causes problems. Power consumption may be reduced by reducing the number of communication modules or sensors, but in this case, accuracy of distance measurement may be reduced and security may be compromised.

In addition, the vehicle and a key fob transmit and receive radio signals for remote control, but the radio signals are distorted by a vehicle body made of metal, causing inaccuracy in positioning.

Therefore, a method capable of solving the above problems is required.

Technical Problem

Embodiments are directed to providing a vehicle digital key system capable of reducing power consumption.

Embodiments are directed to providing a vehicle digital key system capable of minimizing inaccuracy in positioning a key fob.

Problems to be solved in the embodiments are not limited to the above-described problems, and objects and effects which can be determined from the technical solutions and embodiments described below are also included.

Technical Solution

A vehicle digital key system according to an embodiment of the present invention includes a first communication module configured to broadcast a first signal at a predetermined time interval, calculate a distance to a key fob based on a second signal corresponding to the first signal when the first communication module receives the second signal from the key fob, and switch a second communication module from a sleep mode to a wakeup mode when the calculated distance is within a preset first threshold, the second communication module configured to switch a plurality of third communication modules from the sleep mode to the wakeup mode and calculate a position of the key fob using at least three third communication modules among the plurality of third communication modules, and a controller configured to unlock a door of a vehicle based on the position of the key fob.

The first communication module may communicate with the key fob using a frequency of 2.4 [GHz] band, and the second communication module and the third communication modules may communicate with the key fob using a baseband frequency and directional antennas.

The second signal may include movement speed information about the key fob.

The first communication module may calculate the distance to the key fob by correcting distance information calculated through a time at which the second signal is transmitted from the key fob and a time at which the second signal is received through a movement speed of the key fob.

The plurality of third communication modules may transmit third signals and calculate respective individual distances to the key fob based on fourth signals corresponding to the third signals when the third communication modules receive the fourth signals from the key fob, and the second communication module may select at least three third communication modules adjacent to each other among the plurality of third communication modules based on the individual distances, switch third communication modules other than the selected third communication modules among the plurality of third communication modules to the sleep mode, and calculate the position of the key fob based on the fourth signals received by the selected third communication modules.

The second communication module may reselect at least three third communication modules using the third communication module having the shortest individual distance from the key fob among the selected three third communication modules, and may switch or maintain third communication modules adjacent to left and right sides of the third communication module having the shortest individual distance to the wakeup mode based on the reselecting, and switch or maintain third communication modules other than the third communication module having the shortest individual distance and the third communication modules adjacent to the left and right sides to the sleep mode.

The second communication module may switch the plurality of third communication modules to the wakeup mode when at least one of the selected third communication modules does not receive the fourth signal.

The second communication module may communicate with the key fob when the door of the vehicle is closed after being opened, and the controller may start the vehicle based on a result of communication between the second communication module and the key fob and a sensing signal when the sensing signal is received from a sensor disposed in the vehicle.

The second communication module may switch the plurality of third communication modules to the wakeup mode when the second communication module communicates with the key fob, and may maintain the plurality of third communication modules in the wakeup mode and cut off start of the vehicle when the fourth signals corresponding to the third signals transmitted by the plurality of third communication modules switched to the wakeup mode are received, and switch the plurality of third communication modules from the wakeup mode to the sleep mode when the fourth signals corresponding to the third signals are not received.

In a vehicle digital key control method using a vehicle digital key system of a vehicle including a first communication module, a second communication module, and a third communication module, the vehicle digital key control method includes broadcasting, by the first communication module, a first signal at a predetermined time interval, calculating, by the first communication module, a distance to a key fob based on a second signal corresponding to the first signal when the first communication module receives the second signal from the key fob, switching, by the first communication module, a second communication module from a sleep mode to a wakeup mode when the calculated distance is within a preset first threshold, switching, by the second communication module, a plurality of third communication modules from the sleep mode to the wakeup mode when the calculated distance is within the preset first threshold, calculating, by the second communication module, a position of the key fob using at least three third communication modules among the plurality of third communication modules, and unlocking, by a controller, a door of the vehicle based on the position of the key fob.

The first communication module may communicate with the key fob using a frequency of 2.4 [GHz] band, and the second communication module and the third communication modules may communicate with the key fob using a baseband frequency and directional antennas.

The second signal may include movement speed information about the key fob.

The calculating of the distance to the key fob may include calculating the distance to the key fob by correcting distance information calculated through a time at which the second signal is transmitted from the key fob and a time at which the second signal is received through a movement speed of the key fob.

The calculating of the position of the key fob may include transmitting, by the plurality of third communication modules, third signals, calculating, by the plurality of third communication modules, respective individual distances to the key fob based on fourth signals corresponding to the third signals when the plurality of third communication modules receive the fourth signals from the key fob, selecting, by the second communication module, at least three third communication modules adjacent to each other among the plurality of third communication modules based on the individual distances, switching third communication modules other than the selected third communication modules among the plurality of third communication modules to the sleep mode, and calculating, by the second communication module, the position of the key fob based on the fourth signals received by the selected third communication modules.

The calculating of the key fob may include reselecting, by the second communication module, at least three third communication modules using the third communication module having the shortest individual distance from the key fob among the selected three third communication modules, and switching or maintaining third communication modules adjacent to left and right sides of the third communication module having the shortest individual distance to the wakeup mode based on the reselecting and switching or maintaining third communication modules other than the third communication module having the shortest individual distance and the third communication modules adjacent to the left and right sides to the sleep mode.

The vehicle digital key control method may further include switching, by the second communication module, the plurality of third communication modules to the wakeup mode when at least one of the selected third communication modules does not receive the fourth signal.

The vehicle digital key control method may include switching the second communication module from the sleep mode to the wakeup mode when the door of the vehicle is closed after being opened, communicating with the key fob by the second communication module, and starting, by the controller, the vehicle based on a result of communication between the second communication module and the key fob and a sensing signal when the sensing signal is received from a sensor disposed in the vehicle.

The vehicle digital key control method may include switching the plurality of third communication modules to the wakeup mode when the second communication module communicates with the key fob, transmitting the third signals by the third communication modules switched to the wakeup mode, and maintaining the plurality of third communication modules in the wakeup mode and cutting off start of the vehicle when the fourth signals corresponding to the third signals and switching the plurality of third communication modules from the wakeup mode to the sleep mode when the fourth signals corresponding to the third signals are not received.

Advantageous Effects

According to the embodiments, power consumption of a vehicle digital key system can be reduced.

According to the embodiments, a position of a key fob can be accurately detected.

Various beneficial advantages and effects of the present invention are not limited by the contents described above and should be easily understood through a description of a detailed embodiment of the present invention.

MODES OF THE INVENTION

Hereinafter, preferred embodiments of the present invention will be described in detail with reference to the accompanying drawings.

However, the technical idea of the present invention is not limited to some embodiments to be described but may be implemented in various different forms, and, within the scope of the technical idea of the present invention, one or more among components in the embodiments may be used by being selectively combined and substituted.

Further, unless specifically defined and described, terms used in the embodiments of the present invention (including technical and scientific terms) may be construed as meanings which are generally understood by those skilled in the art to which the present invention pertains, and commonly used terms such as terms defined in the dictionary may be interpreted in consideration of the contextual meaning of the related art.

The terms used in the embodiments of the present invention are for the purpose of describing the embodiments only and are not intended to limit the invention.

In the present specification, the singular forms may include the plural forms unless the context clearly dictates otherwise, and, when described as "at least one (or one or more) among A, B, and (or) C," it may include one or more of all possible combinations of A, B, and C.

In addition, in describing a component of embodiments of the present invention, terms such as first, second, A, B, (a), (b), etc. may be used.

These terms are only for distinguishing the component from other components, and the essence, sequence, or order of the component is not limited by the terms.

In addition, when a component is described as being "linked," "coupled," or "connected" to another component, the component is not only directly linked, coupled, or connected to another component, but also "linked," "coupled," or "connected" to another component with still another component disposed between the component and the other component.

Further, when a component is described as being formed or disposed "on (above) or under (below)" of another component, the term "on (above) or under (below)" includes not only when two components are in direct contact with each other, but also when one or more of other components are formed or disposed between the two components. Further, when a component is described as being "on (above) or below (under)," the description may include the meanings of an upward direction and a downward direction based on one component.

Figure 1:
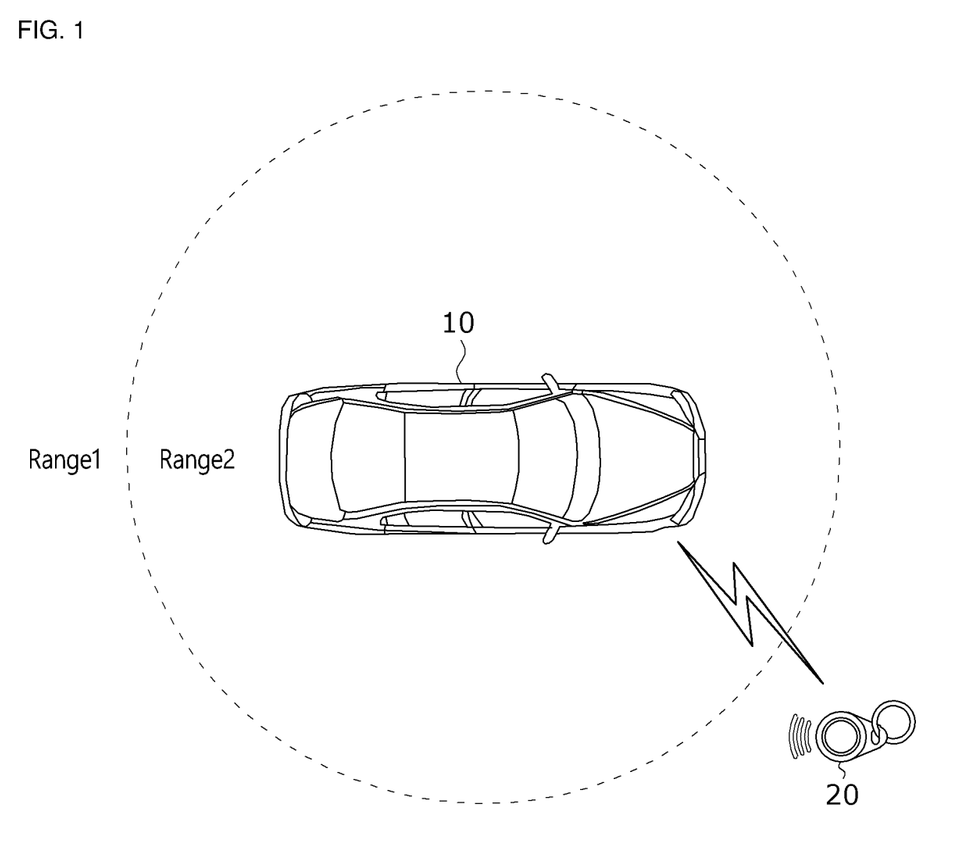
FIG. 1 is a diagram schematically illustrating a vehicle digital key system according to an embodiment of the present invention.

FIG. 1 is a diagram schematically illustrating a vehicle digital key system according to an embodiment of the present invention.

Referring to FIG. 1, the vehicle digital key system according to the embodiment of the present invention may include a vehicle 10 and a key fob 20.

The vehicle 10 may refer to a transportation means capable of traveling on a road or a track. For example, the vehicle 10 may include transportable means such as a truck as well as a car.

The key fob 20 may refer to a device capable of controlling the vehicle 10 from inside or outside the vehicle 10. According to the embodiment, the key fob 20 may refer to a means capable of opening or closing a door of the vehicle 10 or starting the vehicle 10 inside or outside the vehicle 10. The key fob 20 may be a terminal device including a communication module or the like. For example, the key fob 20 may be an electronic key type device or a portable terminal device such as a smartphone.

According to one embodiment, the vehicle 10 may open or close a door or start the vehicle according to a positional relationship between the key fob 20 and the vehicle 10. For example, the key fob 20 communicates with a first communication module of the vehicle 10 when the key fob 20 is positioned in a first range Range1, and the vehicle 10 determines a distance to the key fob 20 through a communication result. In addition, the key fob 20 communicates with a second communication module and a third communication module of the vehicle 10 when the key fob 20 is positioned in a second range2, and the vehicle 10 determines a position of the key fob 20 through a communication result. When the key fob 20 is positioned at a predetermined point, the vehicle 10 may open or close the door of the vehicle 10 or start the vehicle 10. Door opening and closing and starting of the vehicle 10 may be automatically performed when a condition is satisfied, but are not limited thereto. The key fob 20 may provide a button for opening and closing the door of the vehicle 10 or starting the vehicle 10, and be implemented in a manner in which the button is activated when a corresponding condition is satisfied.

Figure 2:
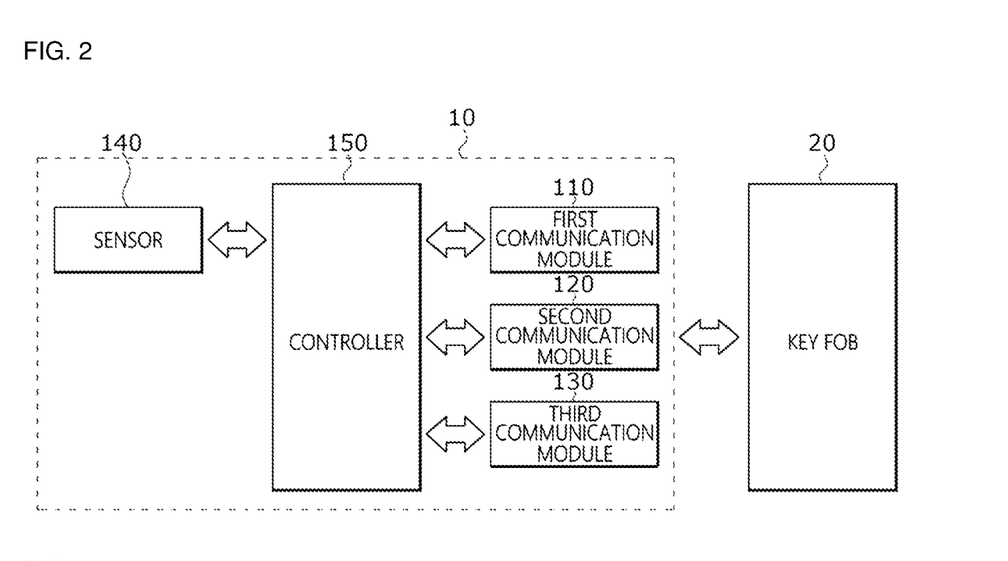
FIG. 2 is a configuration diagram of the vehicle digital key system according to the embodiment of the present invention.

FIG. 2 is a configuration diagram of the vehicle digital key system according to the embodiment of the present invention.

Referring to FIG. 2, the vehicle digital key system according to the embodiment of the present invention may include the vehicle 10 and the key fob 20, and the vehicle 10 may include a first communication module 110, a second communication module 120, a third communication module 130, a sensor 140, and a controller 150.

The first communication module 110 may broadcast a first signal at a predetermined time interval. For example, the first communication module 110 may broadcast the first signal at a time interval of 2 [s]. The first signal may include a data packet. The first communication module 110 may use an omnidirectional antenna, through which the first signal may be omnidirectionally broadcasted. The first communication module 110 may communicate with the key fob 20 using a frequency band of 2.4 [GHz]. The first communication module 110 may be a Bluetooth Low Energy (BLE) communication module.

When the first communication module 110 receives a second signal corresponding to the first signal from the key fob 20, the first communication module 110 may calculate a distance to the key fob 20 based on the second signal.

According to the embodiment, the first communication module 110 may calculate the distance to the key fob 20 by correcting distance information calculated through a time at which the second signal is transmitted from the key fob 20 and a time at which the second signal is received through a movement speed of the key fob 20. For example, the first communication module 110 may calculate the distance between the vehicle 10 and the key fob 20 through a time interval between the time at which the second signal is transmitted and the time at which the second signal is received and the speed of light. In addition, the first communication module 110 may calculate the distance to the key fob 20 by calculating a movement amount of the key fob 20 through the movement speed of the key fob 20 and the calculated time interval and correcting the calculated distance through the calculated movement amount.

The first communication module 110 may switch the second communication module 120 from a sleep mode to a wakeup mode based on the calculated distance. According to the embodiment, the first communication module 110 may switch the second communication module 120 from the sleep mode to the wakeup mode by generating a control signal when the calculated distance is within a preset first threshold. The sleep mode may refer to a low power standby mode, and may refer to a mode in which signal transmission and reception are not performed. The wakeup mode is an active mode and may refer to a mode in which signal transmission and reception are performed. The first communication module 110 may transmit and receive signals to and from the second communication module 120 through Serial Peripheral Interface (SPI) communication.

When the second communication module 120 is switched to the wakeup mode by the first communication module 110, the second communication module 120 may switch a plurality of third communication modules 130 from the sleep mode to the wakeup mode by generating a control signal. The second communication module 120 may operate as a controller that switches the third communication modules 130 from the sleep mode to the wakeup mode or from the wakeup mode to the sleep mode. The second communication module 120 may transmit and receive signals (data) with the third communication modules 130 through controller area network (CAN) communication.

The second communication module 120 may calculate the position of the key fob 20 using at least three third communication modules 130 among the plurality of third communication modules 130. Specifically, the second communication module 120 may receive information on an individual distance to the key fob 20 from each of the plurality of third communication modules 130. Then, the second communication module 120 may select at least three third communication modules 130 from among the plurality of third communication modules 130 based on the individual distances. In one embodiment, the second communication module 120 may select a third communication module 130 having the shortest individual distance and third communication modules 130 positioned on the left and right sides of the third communication module 130 having the shortest individual distance as the three third communication modules 130. The second communication module 120 may switch third communication modules 130 other than the selected third communication modules 130 among the plurality of third communication modules 130 to the sleep mode.

The second communication module 120 may reselect three third communication modules 130 among the plurality of third communication modules 130 and switch the selected third communication modules 130 to the wakeup mode. Specifically, according to one embodiment, the second communication module 120 may reselect at least three third communication modules using the third communication module 130 having the shortest individual distance from the key fob 20 among the selected three third communication modules 130. Further, the second communication module 120 may switch or maintain third communication modules 130 adjacent to the left and right sides of the third communication module 130 having the shortest individual distance to the wakeup mode based on the reselecting, and switch or maintain third communication modules 130 other than the third communication module 130 having the shortest individual distance and the third communication modules 130 adjacent to the left and right sides thereof to the sleep mode. In addition, when at least one of the selected third communication modules 130 does not receive a fourth signal, the second communication module 120 may switch the plurality of third communication modules 130 to the wakeup mode, and then reselect at least three third communication modules 130.

The second communication module 120 may calculate the position of the key fob 20 based on the fourth signals received by the selected third communication modules 130. Specifically, the second communication module 120 may receive individual distances to the key fob 20 from the selected third communication modules 130 and calculate the position of the key fob 20 using the received individual distances. The second communication module 120 may calculate the position of the key fob 20 by applying individual distance information about the three third communication modules 130 to a triangulation algorithm.

The second communication module 120 may communicate with the key fob 20 when the door of the vehicle 10 is closed after being opened.

According to one embodiment, the second communication module 120 may switch the plurality of third communication modules 130 to the wakeup mode after performing communication with the key fob 20. When the fourth signals corresponding to third signals transmitted by the plurality of third communication modules 130 switched to the wakeup mode are received, the second communication module 120 may maintain the third communication modules 130 in the wakeup mode and cut off the start of the vehicle 10. Further, the second communication module 120 may find out the position of the key fob by selecting at least three third communication modules 130. On the other hand, when the fourth signals corresponding to the third signals are not received, the second communication module 120 may switch the plurality of third communication modules 130 that have been woken up from the wakeup mode to the sleep mode.

The third communication modules 130 may transmit the third signals. When the third communication modules 130 receive the fourth signals corresponding to the third signals from the key fob 20, the third communication modules 130 may calculate the respective individual distance to the key fob 20 based on the fourth signals.

The second communication module 120 and the third communication modules 130 may communicate with the key fob 20 using a frequency band of a baseband and a directional antenna. The second communication module 120 and the third communication modules 130 may be ultra-wideband (UWB) communication modules.

The sensor 140 may detect whether a driver is sitting on a driver's seat of the vehicle 10. For example, the sensor 140 may be disposed in the driver's seat of the vehicle 10, and when the driver sits on the driver's seat, the sensor 140 may detect the fact that the driver is sitting on the driver's seat and generate a sensing signal. The detected sensing signal may be transmitted to the controller 150. The sensor 140 may be implemented as a piezoelectric sensor or a pressure sensor, but is not limited thereto.

A near field communication (NFC) module (not shown) may read an NFC tag included in the key fob 20. The NFC module may be used when a battery of the key fob 20 is low (or discharged). According to one embodiment, the NFC module may be disposed in the driver's seat of the vehicle, and may be used at the time of starting the vehicle. According to one embodiment, the NFC module may be disposed on a door of a vehicle, and may be used at the time of opening and closing the vehicle.

The controller 150 may unlock the door of the vehicle 10 based on the position of the key fob 20. For example, when it is determined that the key fob 20 is positioned within 1 [m] from the driver's seat of the vehicle 10, the controller 150 may unlock the door of the vehicle 10. In another embodiment, the controller 150 may lock the door of the vehicle 10 based on the position of the key fob 20. For example, when it is determined that the key fob 20 is positioned 5 [m] or more away from the driver's seat of the vehicle 10, the controller 150 may lock the door of the vehicle 10. The controller 150 may receive position information about the key fob 20 from the second communication module 120.

When a sensing signal is received from the sensor 140 disposed in the vehicle 10, the controller 150 may start the vehicle 10 based on a communication result between the second communication module 120 and the key fob 20 and the sensing signal. For another example, the controller 150 may start the vehicle 10 based on a sensing result of the NFC module and the sensing signal of the sensor 140.

The controller 150 may be implemented as a micro controller unit (MCU).

The key fob 20 may include communication modules respectively corresponding to the first communication module 110, the second communication module 120, and the third communication modules 130 of the vehicle 10 to transmit and receive signals to and from the first communication module 110, the second communication module 120, and the third communication modules 130. In addition, the key fob 20 may further include an NFC tag for communicating with the NFC module of the vehicle 10. When the key fob 20 is implemented as a mobile terminal such as a smartphone, applications that may be manipulated by a user may be further included.

The key fob 20 may receive the first signal, generate the second signal corresponding thereto, and then transmit the generated second signal. The second signal may include movement speed information about the key fob 20. The key fob 20 may include an inertial sensor such as a gyro sensor or an acceleration sensor, through which the movement speed may be calculated. The key fob 20 may receive the third signal, generate the fourth signal corresponding thereto, and then transmit the generated fourth signal.

Figure 3:
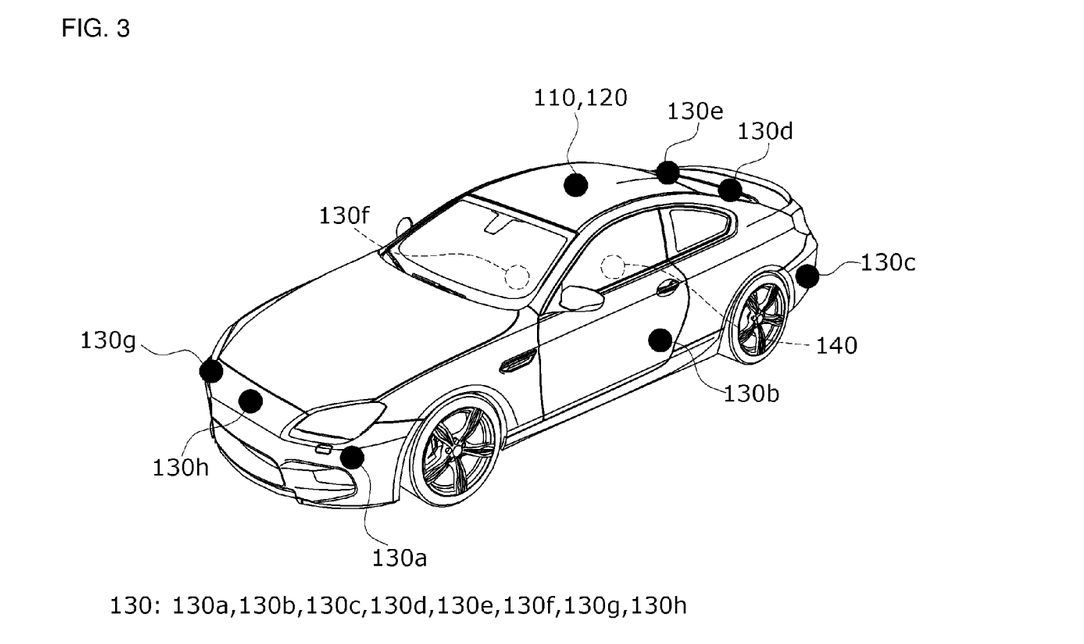
FIG. 3 is a diagram for describing positions where communication modules and a sensor are disposed in a vehicle according to the embodiment of the present invention.

FIG. 3 is a diagram for describing positions where communication modules and a sensor are disposed in a vehicle according to the embodiment of the present invention.

Referring to FIG. 3, the first communication module 110, the second communication module 120, the plurality of third communication modules 130, and the sensor 140 may be disposed in the vehicle.

The first communication module 110 may be disposed on a roof of the vehicle. The first communication module 110 may transmit the first signal in all directions of the vehicle using an omnidirectional antenna. Since the first communication module 110 is disposed on the roof of the vehicle, radio wave interference caused by a vehicle body (e.g., a side surface of the vehicle body) may be minimized when the first signal is broadcast.

The second communication module 120 may be disposed on the roof of the vehicle. The second communication module 120 may be designed to be integrated with the first communication module 110 into one module, but is not limited thereto. The second communication module 120 may be designed and disposed separately from the first communication module 110. The second communication module 120 may transmit the third signal toward the inside of the vehicle using a directional antenna. The second communication module 120 may not be able to communicate with the key fob outside the vehicle when the vehicle door is closed because the antenna thereof is disposed to point toward the inside of the vehicle.

The plurality of third communication modules 130 may be disposed on side surfaces of the vehicle. According to one embodiment, the plurality of third communication modules 130 may include eight third communication modules 130. The eight third communication modules 130a to 130h may be respectively disposed on a front surface, a rear surface, a left side surface, a right side surface, and corner portions of the respective surfaces of the vehicle. The plurality of third communication modules 130 may transmit the third signals toward the outside of the vehicle using directional antennas. The third communication modules 130 may not be able to communicate with the key fob positioned in the vehicle because the antennas thereof are disposed to point toward the outside of the vehicle.

The sensor 140 may be disposed in the driver's seat of the vehicle. The sensor 140 may be disposed on at least one of a seat or a backrest of the driver's seat. The sensor 140 may be disposed on a portion of the driver's seat where it is possible to measure pressure when the driver sits down.

Figure 4:
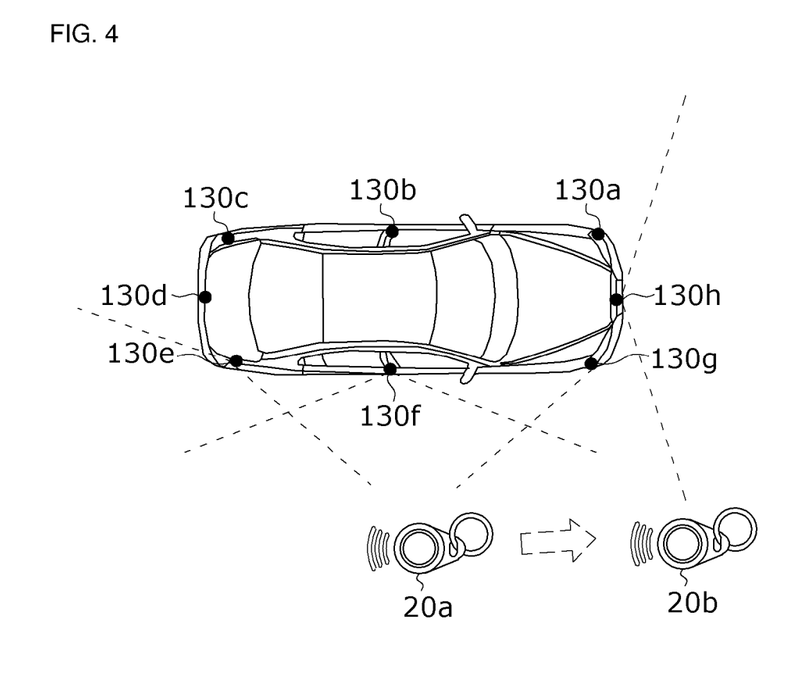
FIG. 4 is a diagram for describing a process of selecting third communication modules according to the embodiment of the present invention.

FIG. 4 is a diagram for describing a process of selecting third communication modules according to the embodiment of the present invention.

Referring to FIG. 4, the eight third communication modules 130a to 130h may be respectively disposed on a front surface, a rear surface, a left side surface, a right side surface, and corner portions of the respective surfaces of the vehicle. The second communication module may select three third communication modules among the eight third communication modules 130a to 130h and switch the selected third communication modules to the wakeup mode. In addition, the second communication module may reselect the selected three third communication modules according to movement of the key fob 20 and switch the reselected three third communication modules to the wakeup mode.

As illustrated in FIG. 4, when a key fob 20a is in a first position, a third communication module having the shortest individual distance from the key fob 20a is a third communication module 130f disposed on the right side surface of the vehicle. In this case, the second communication module may select a third communication module 130e adjacent to the left side and a third communication module 130g adjacent to the right side based on the third communication module 130f disposed on the right side surface of the vehicle, and wake up the third communication modules 130e and 130g and switch other third communication modules 130 to the sleep mode. Then, the second communication module calculates the position of the key fob using the individual distances of the three third communication modules 130e, 130f, and 130g.

When a key fob 20b moves to a second position while the position of the key fob is being calculated through the three third communication modules 130, the third communication module having the shortest individual distance from the key fob 20b becomes the third communication module 130g disposed at a right front corner of the vehicle. Then, the second communication module maintains the wakeup mode of the third communication module 130f disposed on the left side of the third communication module 130g disposed on the right front corner of the vehicle, and switches a third communication module 130h disposed on the right side from the sleep mode to the wakeup mode. Further, the second communication module switches the third communication module 130e disposed at a rear right corner of the vehicle from the wakeup mode to the sleep mode.

If there is no reselection process of the third communication modules according to the movement of the key fob, inaccuracy in positioning the key fob may increase due to the vehicle body having a metal material, and an error may occur in positioning the key fob because the third communication modules receive and transmit signals through directional antennas. However, when the third communication modules are reselected in the same manner as in the embodiment of the present invention, there is an advantage in that the position of the key fob may be accurately positioned even if the key fob moves.

Figure 5A:
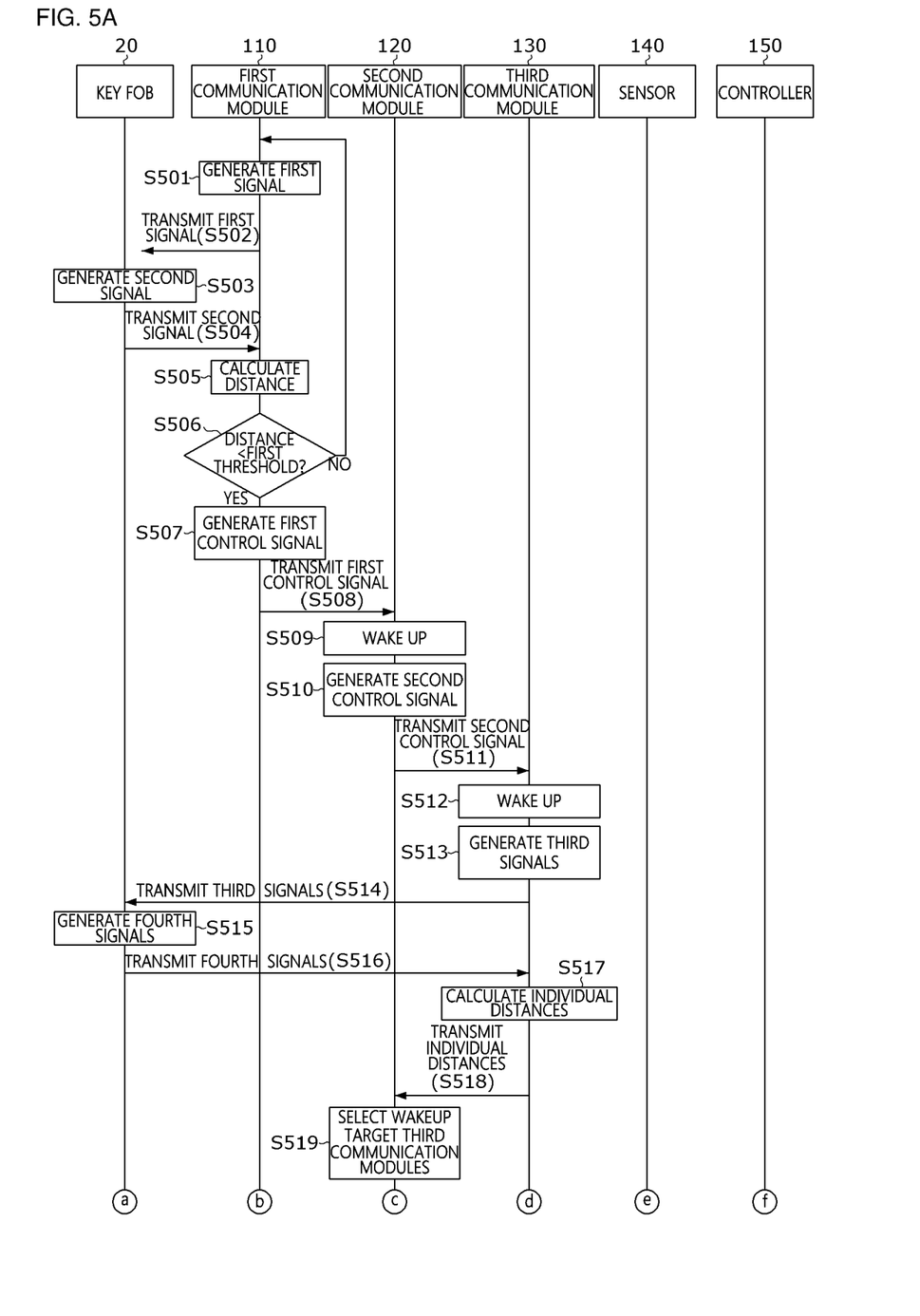
FIGS. 5A and 5B are flowcharts illustrating a digital key driving method using the vehicle digital key system according to the embodiment of the present invention.
Figure 5B:
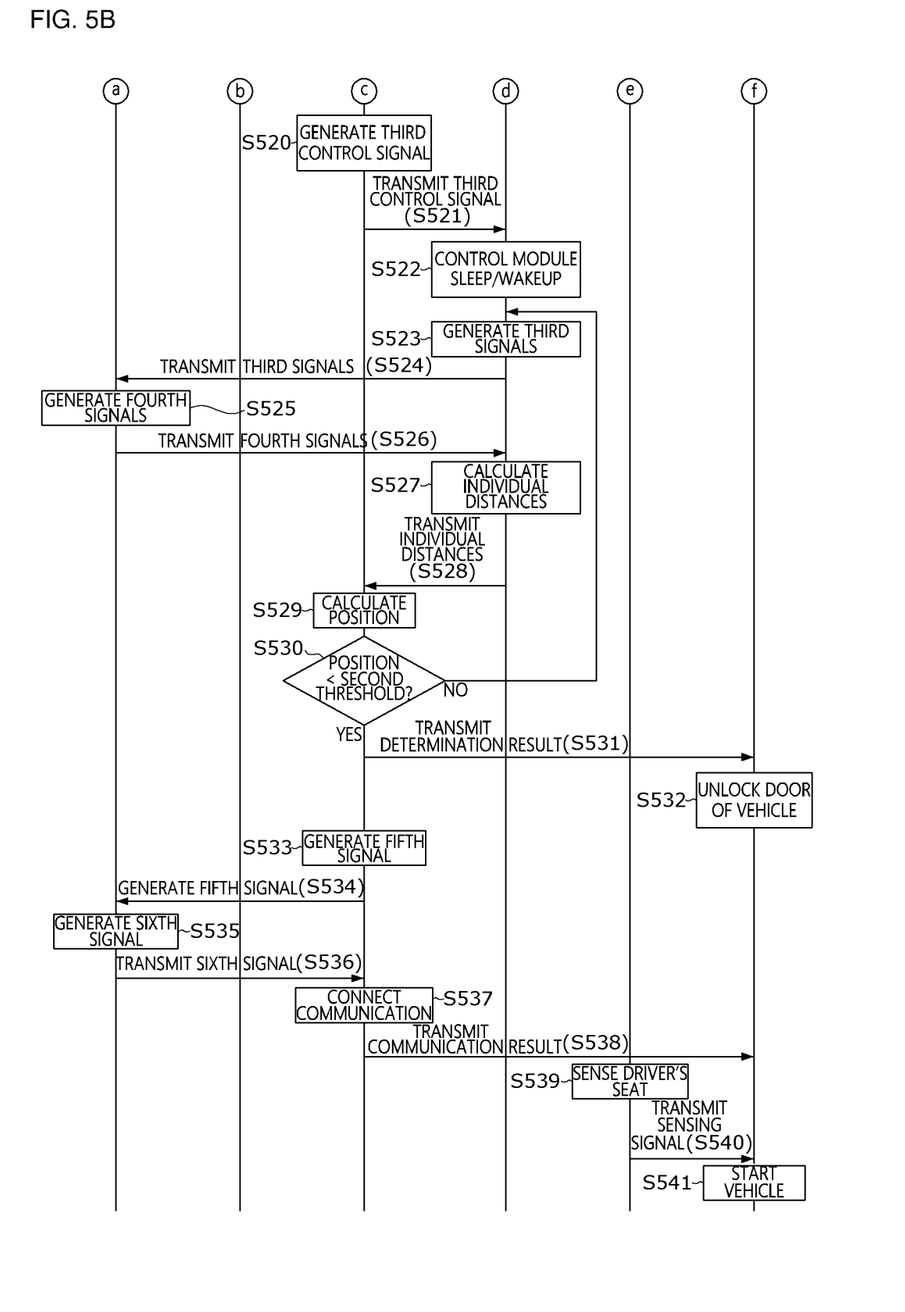

FIGS. 5A and 5B are flowcharts illustrating a digital key driving method using the vehicle digital key system according to the embodiment of the present invention.

Referring to FIGS. 5A and 5B, first, the first communication module may generate a first signal (S501).

Then, the first communication module 110 may broadcast the first signal at a predetermined time interval (S502). The first communication module 110 may broadcast the first signal using an omnidirectional antenna.

The key fob 20 may receive the broadcast first signal. After receiving the first signal, the key fob 20 may generate a second signal corresponding to the first signal (S503). The key fob 20 may transmit the second signal to the first communication module 110 (S504).

When the first communication module 110 receives the second signal from the key fob 20, the first communication module 110 may calculate a distance to the key fob 20 based on the second signal (S505). In this case, the second signal may include movement speed information about the key fob 20. The first communication module 110 may calculate the distance to the key fob 20 by correcting distance information calculated through a time at which the second signal is transmitted from the key fob 20 and a time at which the second signal is received through a movement speed of the key fob 20.

The first communication module 110 compares the distance calculated in operation S505 with a preset first threshold (S506).

The first communication module 110 may switch the second communication module 120 from the sleep mode to the wakeup mode when the calculated distance is within the preset first threshold. Specifically, the first communication module 110 may generate a first control signal capable of switching the second communication module 120 from the sleep mode to the wakeup mode (S507), and transmit the first control signal to the second communication module 120 (S508). The second communication module 120 is switched to the wakeup mode through the first control signal (S509). On the other hand, when the calculated distance is greater than or equal to the preset first threshold, operations S501 to S506 are re-performed.

After switching to the wakeup mode, the second communication module 120 may switch the third communication modules 130 from the sleep mode to the wakeup mode. Specifically, the second communication module 120 may generate a second control signal (S510), and transmit the second control signal to the third communication modules 130 (S511). Then, the plurality of third communication modules 130 receiving the second control signal are switched to the wakeup mode (S512).

The plurality of third communication modules 130 switched to the wakeup mode may generate third signals (S513). Then, the plurality of third communication modules 130 may transmit the third signals (S514).

The key fob 20 may receive the transmitted third signals. After receiving the third signals, the key fob 20 may generate fourth signals corresponding to the third signals (S515).

The key fob 20 may transmit the fourth signals to the third communication modules 130 (S516).

The plurality of third communication modules 130 may calculate respective individual distances to the key fob 20 based on the received fourth signals (S517).

The plurality of third communication modules 130 may transmit the calculated individual distances to the key fob 20 to the second communication module 120 (S518).

Then, the second communication module 120 may select at least three third communication modules 130 from among the plurality of third communication modules 130 based on the received individual distances (S519).

The second communication module 120 may switch third communication modules 130 other than the selected third communication modules 130 among the plurality of third communication modules 130 to the sleep mode. Specifically, the second communication module 120 may generate a third control signal for switching the unselected third communication modules 130 to the sleep mode (S520), and then transmit the third control signal to the plurality of third communication modules 130 (S521), and switch the unselected third communication modules 130 from the wakeup mode to the sleep mode (S522). Accordingly, only some of the plurality of third communication modules 130 are operated, and as a result, power consumed by the vehicle digital key system may be reduced.

The selected third communication modules 130 generate third signals (S523) and transmit the third signals to the key fob 20 (S524). The key fob 20 receiving the third signals generates fourth signals (S525) and transmits the fourth signals to the selected third communication modules 130 (S526).

The selected third communication modules 130 calculate individual distances to the key fob 20 based on the received fourth signals (S527) and transmit a result of the calculating to the second communication module 120 (S528).

Then, the second communication module 120 calculates the position of the key fob 20 using the individual distances to the key fob 20 received from the selected third communication modules 130 (S529).

Then, the second communication module 120 may compare the position of the key fob 20 with a second threshold (S530). When the position of the key fob 20 is within the second threshold, a comparison result may be transmitted to the controller 150 (S531). Then, the controller 150 unlocks the door of the vehicle based on the comparison result (S532). On the other hand, when the position of the key fob 20 is greater than the second threshold, operations S623 to S630 are repeatedly performed.

The second communication module 120 may communicate with the key fob 20 when the door of the vehicle 10 is closed after being opened. Specifically, the second communication module 120 may generate a fifth signal (S533) and transmit the fifth signal to the key fob 20 (S534), and the key fob 20 receiving the fifth signal may generate a sixth signal corresponding to the fifth signal (S535) and transmit the sixth signal to the second communication module 120 (S536), thereby performing a communication connection (S537). Since the second communication module 120 has a directional antenna pointing toward the inside of the vehicle, when the key fob 20 is positioned in the vehicle, the second communication module 120 and the key fob 20 may communicate with each other.

Then, the sensor 140 may sense a driver's seat of the vehicle (S539) and transmit a sensing signal to the controller 150 (S540).

When the sensing signal is received from the sensor 140 disposed in the vehicle, the controller 150 starts the vehicle based on a communication result between the second communication module 120 and the key fob 20 and the sensing signal (S541). That is, the controller 150 may start the vehicle after double checking whether a driver with the key fob 20 gets on the vehicle through the communication result and the sensing signal, and in this way, safety of the vehicle driving may be improved.

Figure 6:
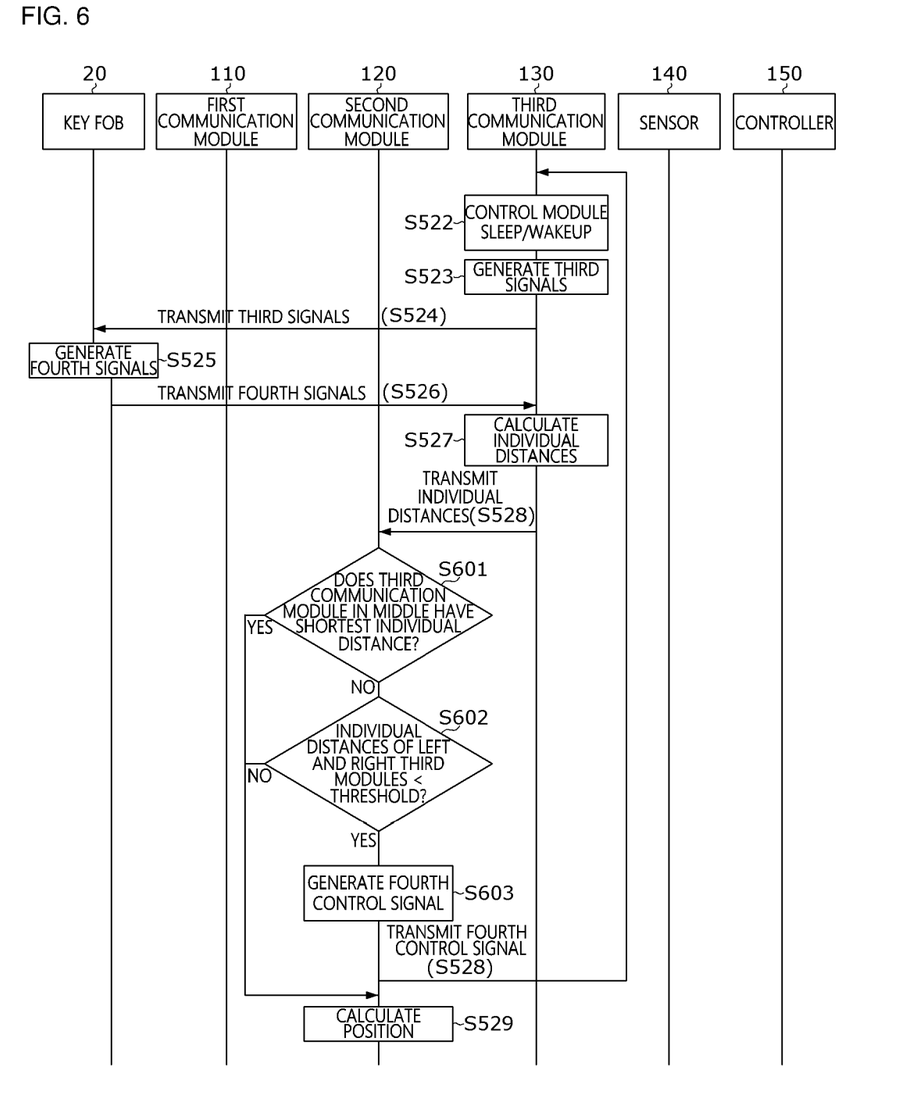
FIG. 6 is a flowchart illustrating a digital key driving method using the vehicle digital key system according to one embodiment of the present invention.

FIG. 6 is a flowchart illustrating a digital key driving method using the vehicle digital key system according to one embodiment of the present invention.

Referring to FIG. 6, operations S701 to S704 may be further included between operations S528 and S529 of FIGS. 5A and 5B. The operations S601 to S603 may be operations for reselecting the selected third communication modules 130. For example, when the position of the key fob 20 moves from the left side of the vehicle to the rear, an error may occur in transmitting and receiving signals between the key fob 20 and the third communication module 130 disposed on the left side of the vehicle. This is because not only does the third communication modules 130 use a directional antenna, but also signal distortion occurs due to the metal material of the vehicle body. In order to solve the problem, the second communication module 120 may reselect at least three third communication modules 130 using the third communication module 130 having the shortest individual distance from the key fob 20 among the selected three third communication modules 130. The second communication module 120 may switch or maintain third communication modules 130 adjacent to the left and right sides of the third communication module 130 having the shortest individual distance to the wakeup mode based on the reselecting, and switch or maintain third communication modules 130 other than the third communication module 130 having the shortest individual distance and the third communication modules 130 adjacent to the left and right sides to the sleep mode.

Hereinafter, one embodiment of the present disclosure will be described with reference to FIG. 6.

First, when the selected third communication modules 130 calculate the individual distances (S527) and transmit the individual distances (S528), the second communication module 120 may determine whether or not the individual distance of a third communication module 130 positioned in the middle among the selected three third communication modules 130 is the shortest (S601).

When the individual distance of the third communication module 130 positioned in the middle is the shortest, the second communication module 120 may calculate the position of the key fob 20 using the individual distances of the previously selected three third communication modules 130 without reselecting the third communication modules 130 (S629).

On the other hand, when the individual distance of the third communication module 130 positioned in the middle is not the shortest, the second communication module 120 may compare the individual distances of the selected left and right third communication modules 130 with a threshold (S602).

When the individual distances of the selected left and right communication modules 130 are greater than or equal to the threshold, the second communication module 120 may calculate the position of the key fob 20 using the individual distances of the previously selected three third communication modules 130 without reselecting the third communication modules 130 (S629).

On the other hand, when at least one of the individual distances of the selected left and right third communication modules 130 is smaller than the threshold, the second communication module 120 may reselect the third communication modules 130 based on the left third communication module 130 or the right third communication module 130 and then generate a fourth control signal (S603).

For example, when the individual distance of the left third communication module 130 is smaller than the threshold, the second communication module 120 may generate the fourth signal for switching the third communication module 130 adjacent to the left side of the left third communication module 130 to the wakeup mode, and maintaining the third communication module 130 adjacent to the right side in the wakeup mode. For another example, when the individual distance of the right third communication module 130 is smaller than the threshold, the second communication module 120 may generate the fourth control signal for maintaining the third communication module 130 adjacent to the left side of the right third communication module 130 in the wakeup mode, and switching the third communication module 130 adjacent to the right side to the wakeup mode. When both the left third communication module 130 and the right third communication module 130 are smaller than the threshold, the second communication module 120 may generate the fourth control signal based on the third communication module 130 having a shorter individual distance as described above.

Meanwhile, according to one embodiment, when at least one of the previously selected third communication modules 130 does not receive the fourth signal, the second communication module 120 may switch the plurality of third communication modules 130 to the wakeup mode and reselect at least three third communication modules 130.

Figure 7:
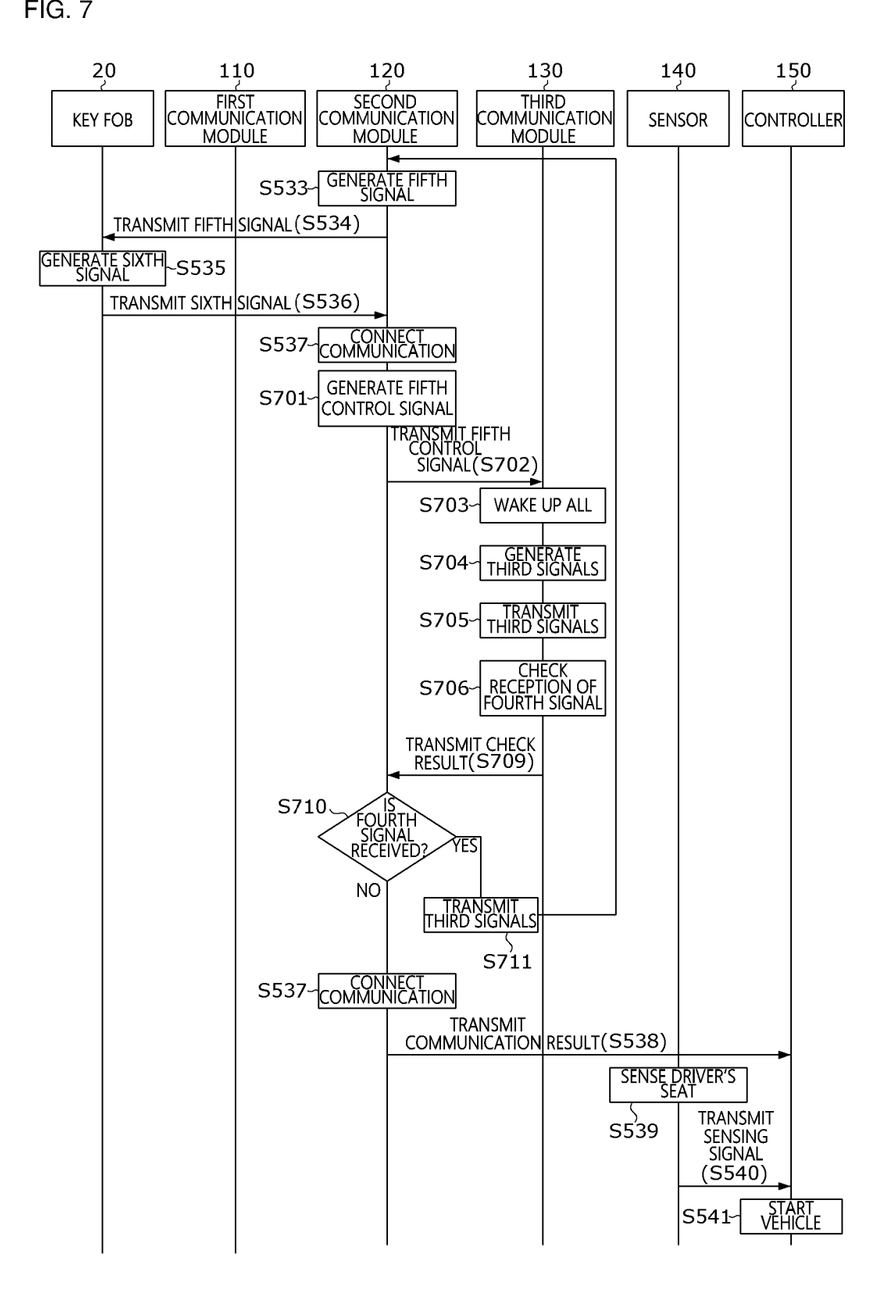
FIG. 7 is a flowchart illustrating a digital key driving method using the vehicle digital key system according to another embodiment of the present invention.

FIG. 7 is a flowchart illustrating a digital key driving method using the vehicle digital key system according to another embodiment of the present invention.

As described above, since the body of the vehicle is made of a metal material, signal distortion may occur. Accordingly, there may be a problem that it is determined that the driver with the key fob 20 is in the vehicle even though he or she does not actually get on the vehicle and thus the vehicle is started. In order to solve the problem, the present invention secures the safety of starting the vehicle by rechecking the position of the key fob 20 after the driver gets on the vehicle.

Referring to FIG. 7, when the second communication module 120 communicates with the key fob 20 (S537), the second communication module 120 may generate a fifth control signal (S701) and transmit the fifth control signal to the third communication modules 130 (S702), thereby switching all of the plurality of third communication modules 130 to the wakeup mode (S703).

The plurality of third communication modules 130 switched to the wakeup mode may generate third signals (S704) and transmit the third signals (S705). Then, the plurality of third communication modules 130 check whether the fourth signals are received from the key fob 20 (S706) and transmit a check result to the second communication module 120 (S709). When it is determined that the fourth signals corresponding to the third signals have been received as a result of reception (S710), the second communication module 120 may disconnect the communication from the key fob 20. Since the key fob 20 may be outside the vehicle when the fourth signals are received, start of the vehicle may be blocked by disconnecting the communication. On the other hand, when the fourth signals corresponding to the third signals are not received, the second communication module 120 may maintain the communication connection with the key fob 20. Then, the second communication module 120 may switch the plurality of third communication modules 130 from the wakeup mode to the sleep mode.

While the present invention has been described with reference to the embodiments, but these are only exemplary and do not intend to limit the present invention, and those skilled in the art to which the present invention pertains will appreciate that various modifications, variations, and alterations that are not illustrated above could be made without departing from the essential characteristics of the present embodiments. For example, the components specifically shown in the embodiments may be modified. It should be construed that differences associated with such modifications and alternations fall within the scope of the present invention defined by the accompanying claims.

The invention claimed is:

1. A vehicle digital key system comprising:
a first communication module configured to broadcast a first signal at a predetermined time interval, calculate a distance to a key fob based on a second signal corresponding to the first signal when the first communication module receives the second signal from the key fob, and switch a second communication module from a sleep mode to a wakeup mode when the calculated distance is within a preset first threshold;
the second communication module configured to switch a plurality of third communication modules from the sleep mode to the wakeup mode and calculate a position of the key fob using at least three third communication modules among the plurality of third communication modules; and
a controller configured to unlock a door of a vehicle based on the position of the key fob,
wherein the plurality of third communication modules transmit third signals and calculate respective individual distances to the key fob based on fourth signals corresponding to the third signals when the third communication modules receive the fourth signals from the key fob, and
the second communication module:
selects at least three third communication modules adjacent to each other among the plurality of third communication modules based on the individual distances and calculates the position of the key fob using the individual distances of the selected three third communication modules when the individual distance of the third communication module positioned in a middle among the selected third communication modules is the shortest; and
when the individual distance of the third communication module positioned in the middle among the selected third communication modules is not the shortest, calculates the position of the key fob using the individual distances of the selected three third communication modules when the individual distances of selected left and right third communication modules are greater than or equal to a threshold, and reselects third communication modules based on the left third communication module or the right third communication module when the individual distances of the selected left and right third communication modules are smaller than the threshold.

2. The vehicle digital key system of claim 1, wherein the first communication module communicates with the key fob using a frequency of 2.4 [GHz] band, and
the second communication module and the third communication modules communicate with the key fob using a baseband frequency and directional antennas.

3. The vehicle digital key system of claim 1, wherein the second signal includes movement speed information about the key fob.

4. The vehicle digital key system of claim 3, wherein the first communication module calculates the distance to the key fob by correcting distance information calculated through a time at which the second signal is transmitted from the key fob and a time at which the second signal is received through a movement speed of the key fob.

5. The vehicle digital key system of claim 4, wherein the first communication module calculates a movement amount of the key fob using the movement speed of the key fob and a time interval between the time at which the second signal is transmitted and the time at which the second signal is received and corrects the distance information by applying the calculated movement amount.

6. The vehicle digital key system of claim 1, wherein the second communication module switches third communication modules other than the selected third communication modules among the plurality of third communication modules to the sleep mode and calculates the position of the key fob based on the fourth signals received by the selected third communication modules.

7. The vehicle digital key system of claim 6, wherein the second communication module:
reselects at least three third communication modules using the third communication module having the shortest individual distance from the key fob among the selected three third communication modules; and
switches or maintains third communication modules adjacent to left and right sides of the third communication module having the shortest individual distance to the wakeup mode based on the reselecting, and switches or maintains third communication modules other than the third communication module having the shortest individual distance and the third communication modules adjacent to the left and right sides to the sleep mode.

8. The vehicle digital key system of claim 6, wherein the second communication module switches the plurality of third communication modules to the wakeup mode when at least one of the selected third communication modules does not receive the fourth signal.

9. The vehicle digital key system of claim 1, wherein the second communication module communicates with the key fob when the door of the vehicle is closed after being opened, and
the controller starts the vehicle based on a result of communication between the second communication module and the key fob and a sensing signal when the sensing signal is received from a sensor disposed in the vehicle.

10. The vehicle digital key system of claim 1, wherein the second communication module:
switches the plurality of third communication modules to the wakeup mode when the second communication module communicates with the key fob; and
maintains the plurality of third communication modules in the wakeup mode and cuts off start of the vehicle when the fourth signals corresponding to the third signals transmitted by the plurality of third communication modules switched to the wakeup mode are received, and switches the plurality of third communication modules from the wakeup mode to the sleep mode when the fourth signals corresponding to the third signals are not received.

11. A vehicle digital key control method using a vehicle digital key system of a vehicle including a first communication module, a second communication module, and a third communication module, the vehicle digital key control method comprising:
- broadcasting, by the first communication module, a first signal at a predetermined time interval;
- calculating, by the first communication module, a distance to a key fob based on a second signal corresponding to the first signal when the first communication module receives the second signal from the key fob;
- switching, by the first communication module, the second communication module from a sleep mode to a wakeup mode when the calculated distance is within a preset first threshold;
- switching, by the second communication module, a plurality of third communication modules from the sleep mode to the wakeup mode when the calculated distance is within the preset first threshold;
- calculating, by the second communication module, a position of the key fob using at least three third communication modules among the plurality of third communication modules; and
- unlocking, by a controller, a door of the vehicle based on the position of the key fob,
- wherein the calculating of the position of the key fob includes:
- transmitting, by the plurality of third communication module, third signals and calculating respective individual distances to the key fob based on fourth signals corresponding to the third signals when the third communication modules receive the fourth signals from the key fob;
- selecting, by the second communication module, at least three third communication modules adjacent to each other among the plurality of third communication modules based on the individual distances and calculating the position of the key fob using the individual distances of the selected three third communication modules when the individual distance of the third communication module positioned in a middle among the selected third communication modules is the shortest; and
- when the individual distance of the third communication module positioned in the middle among the selected third communication modules is not the shortest, calculating the position of the key fob using the individual distances of the selected three third communication modules when the individual distances of selected left and right third communication modules are greater than or equal to a threshold, and reselecting third communication modules based on the left third communication module or the right third communication module when the individual distances of the selected left and right third communication modules are smaller than the threshold.

12. The vehicle digital key control method of claim 11, wherein the first communication module communicates with the key fob using a frequency of 2.4 [GHz] band, and
- the second communication module and the third communication modules communicate with the key fob using a baseband frequency and directional antennas.

13. The vehicle digital key control method of claim 11, wherein the second signal includes movement speed information about the key fob.

14. The vehicle digital key control method of claim 13, wherein the calculating of the distance to the key fob includes calculating the distance to the key fob by correcting distance information calculated through a time at which the second signal is transmitted from the key fob and a time at which the second signal is received through a movement speed of the key fob.

15. The vehicle digital key control method of claim 14, wherein the calculating of the distance to the key fob includes calculating, by the first communication module, a movement amount of the key fob using the movement speed of the key fob and a time interval between the time at which the second signal is transmitted and the time at which the second signal is received and correcting the distance information by applying the calculated movement amount.

16. The vehicle digital key control method of claim 11, wherein the calculating of the position of the key fob includes:
- switching, by the second communication module, third communication modules other than the selected third communication modules among the plurality of third communication modules to the sleep mode; and
- calculating, by the second communication module, the position of the key fob based on the fourth signals received by the selected third communication modules.

17. The vehicle digital key control method of claim 16, wherein the calculating of the position of the key fob includes:
- reselecting, by the second communication module, at least three third communication modules using the third communication module having the shortest individual distance from the key fob among the selected three third communication modules; and
- switching or maintaining third communication modules adjacent to left and right sides of the third communication module having the shortest individual distance to the wakeup mode based on the reselecting, and switching or maintaining third communication modules other than the third communication module having the shortest individual distance and the third communication modules adjacent to the left and right sides to the sleep mode.

18. The vehicle digital key control method of claim 16, further comprising switching, by the second communication module, the plurality of third communication modules to the wakeup mode when at least one of the selected third communication modules does not receive the fourth signal.

19. The vehicle digital key control method of claim 11, comprising:
- switching the second communication module from the sleep mode to the wakeup mode when the door of the vehicle is closed after being opened;
- communicating with the key fob by the second communication module; and
- starting, by the controller, the vehicle based on a result of communication between the second communication module and the key fob and a sensing signal when the sensing signal is received from a sensor disposed in the vehicle.

20. The vehicle digital key control method of claim 11, further comprising:
- switching the plurality of third communication modules to the wakeup mode when the second communication module communicates with the key fob;
- transmitting the third signals by the third communication modules switched to the wakeup mode; and
- maintaining the plurality of third communication modules in the wakeup mode and cutting off start of the vehicle when the fourth signals corresponding to the third signals are received, and switching the plurality of third communication modules from the wakeup mode to the sleep mode when the fourth signals corresponding to the third signals are not received.

* * * * *